United States Patent
Miyata et al.

(10) Patent No.: US 11,328,024 B2
(45) Date of Patent: May 10, 2022

(54) DATA ANALYSIS DEVICE AND DATA ANALYSIS METHOD

(71) Applicant: HITACHI, LTD., Tokyo (JP)

(72) Inventors: Yasushi Miyata, Tokyo (JP); Yohsuke Ishii, Tokyo (JP)

(73) Assignee: HITACHI, LTD., Tokyo (JP)

( * ) Notice: Subject to any disclaimer, the term of this patent is extended or adjusted under 35 U.S.C. 154(b) by 506 days.

(21) Appl. No.: 16/083,682

(22) PCT Filed: Mar. 27, 2017

(86) PCT No.: PCT/JP2017/012439
§ 371 (c)(1),
(2) Date: Sep. 10, 2018

(87) PCT Pub. No.: WO2018/179065
PCT Pub. Date: Oct. 4, 2018

(65) Prior Publication Data
US 2021/0011949 A1     Jan. 14, 2021

(51) Int. Cl.
*G06F 16/906* (2019.01)
*G06F 16/28* (2019.01)
*G06F 16/35* (2019.01)

(52) U.S. Cl.
CPC .......... *G06F 16/906* (2019.01); *G06F 16/285* (2019.01); *G06F 16/35* (2019.01); *G06F 16/355* (2019.01)

(58) Field of Classification Search
CPC .... G06F 16/906; G06F 16/285; G06F 16/355; G06F 16/35; G06F 16/55

USPC ......................................................... 707/737
See application file for complete search history.

(56) References Cited

U.S. PATENT DOCUMENTS

| | | | | |
|---|---|---|---|---|
| 8,363,961 B1* | 1/2013 | Avidan | ................ | G06K 9/6218 707/747 |
| 9,280,593 B1* | 3/2016 | Dykstra | ................ | G06F 16/285 |
| 2009/0307176 A1* | 12/2009 | Jeong | .................... | G06F 16/337 706/52 |
| 2014/0219514 A1* | 8/2014 | Johnston | ................ | G06V 20/13 382/113 |
| 2014/0258295 A1* | 9/2014 | Wang | ..................... | G06F 16/35 707/737 |
| 2016/0292578 A1* | 10/2016 | Ashenfelter | .......... | G06F 16/248 |

FOREIGN PATENT DOCUMENTS

JP       5153677 B2     2/2013

* cited by examiner

*Primary Examiner* — Phong H Nguyen
(74) *Attorney, Agent, or Firm* — Baker Botts L.L.P.

(57) ABSTRACT

A data analysis device is configured to include an arithmetic operation device that determines whether or not each point data in the point data group of the existing clusters is a core of the cluster using a predetermined algorithm and calculates a predetermined re-verification determination data, recalculates an initial condition value of the clustering based on the re-verification determination data, specifies re-verification point data which is the point data that becomes no longer the core or becomes a new core by adding the point data, from the point data group to which the addition was made, based on the updated initial condition value obtained by the recalculation, and performs predetermined clustering processing in accordance with the re-verification point data.

6 Claims, 13 Drawing Sheets

[Fig. 1]
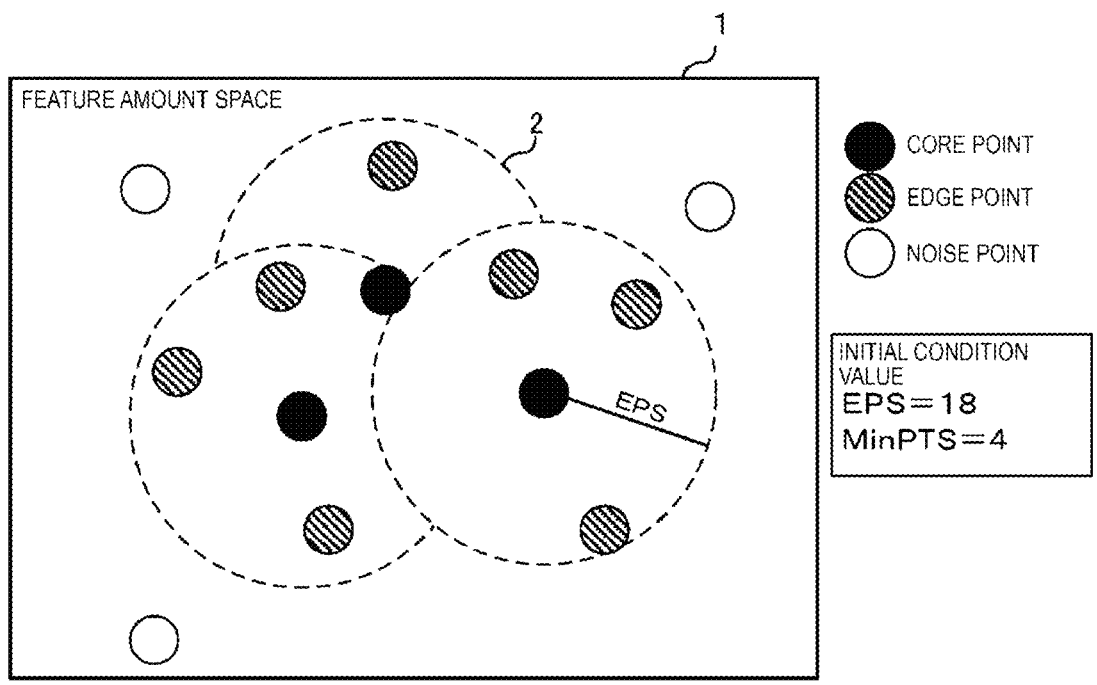
[Fig. 2]
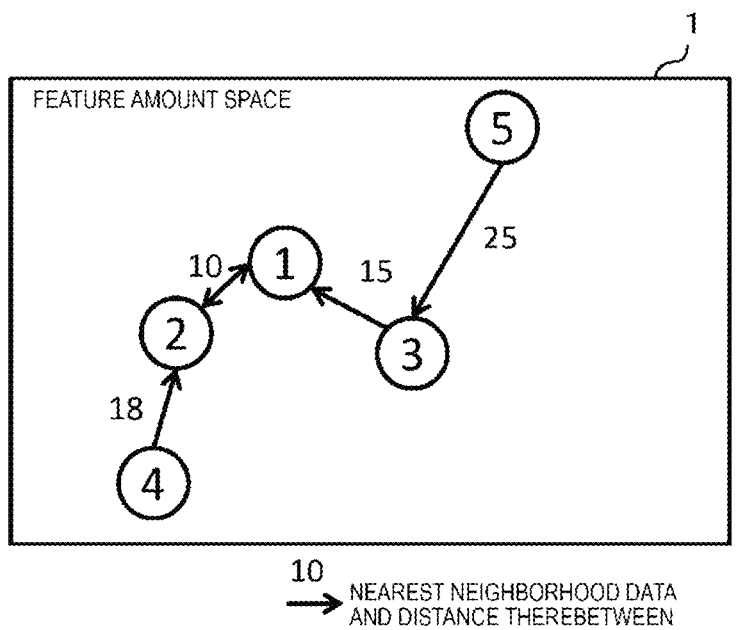

[Fig. 3]
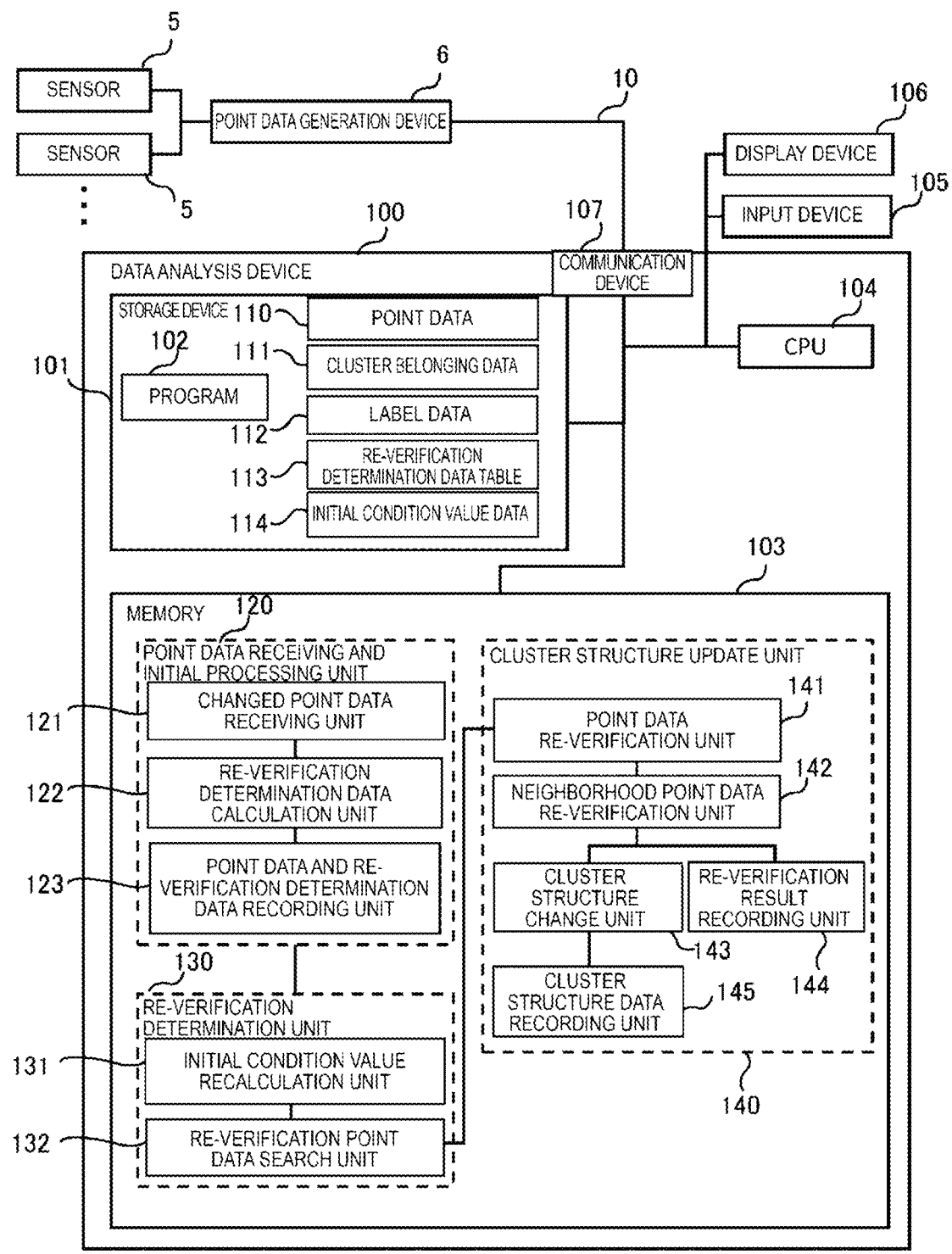

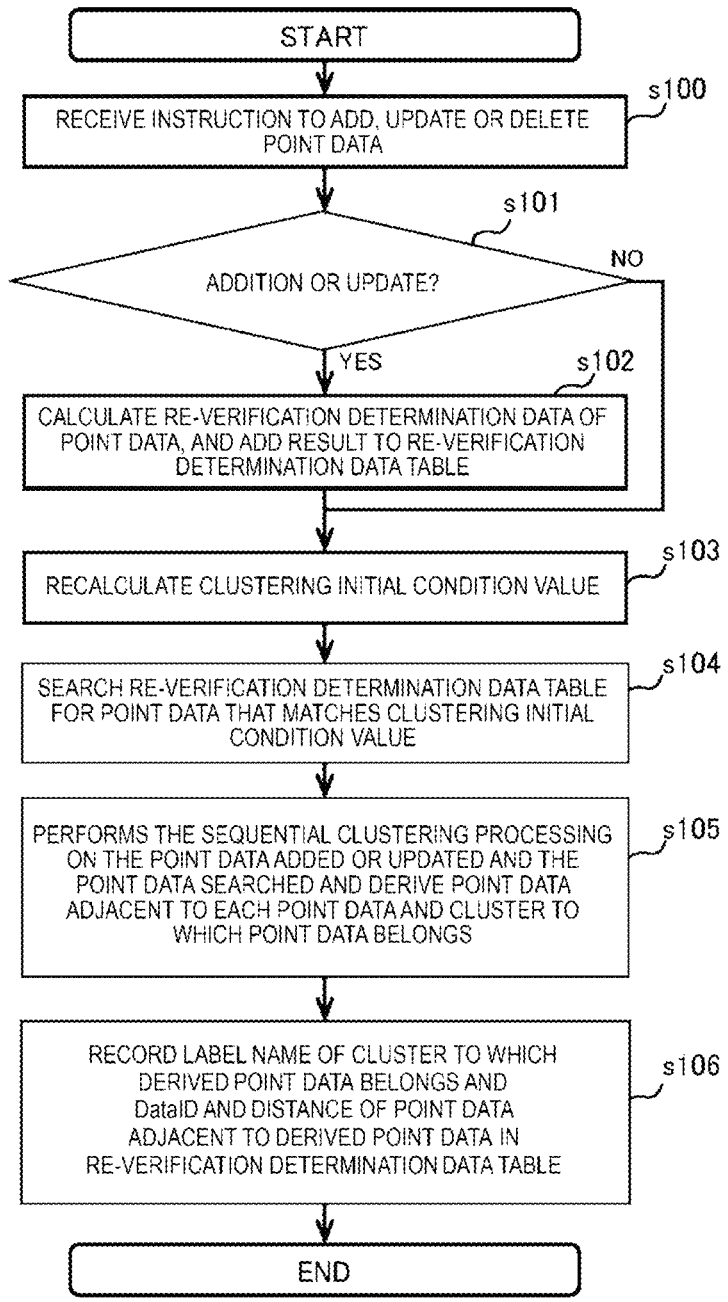
[Fig. 4]

[Fig. 5]
RE-VERIFICATION DETERMINATION DATA TABLE 113
| Data ID | CORE DETERMINATION | CORE CONDITION VALUE | DATA GROUP IN NEIGHBORHOOD OF N |
|---|---|---|---|
| 1 | True | 10 | [2, 10], [3, 15] |
| 2 | True | 10 | [1, 10], [4, 18] |
| 3 | True | 15 | [1, 15] |
| 4 | True | 18 | [2, 18] |
| 5 | False | 25 | Null |
[Fig. 6]
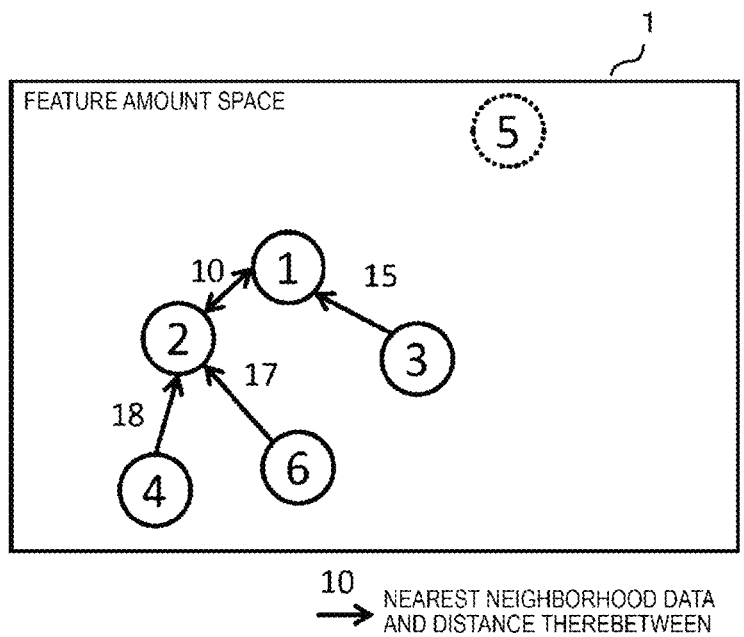

[Fig. 7]
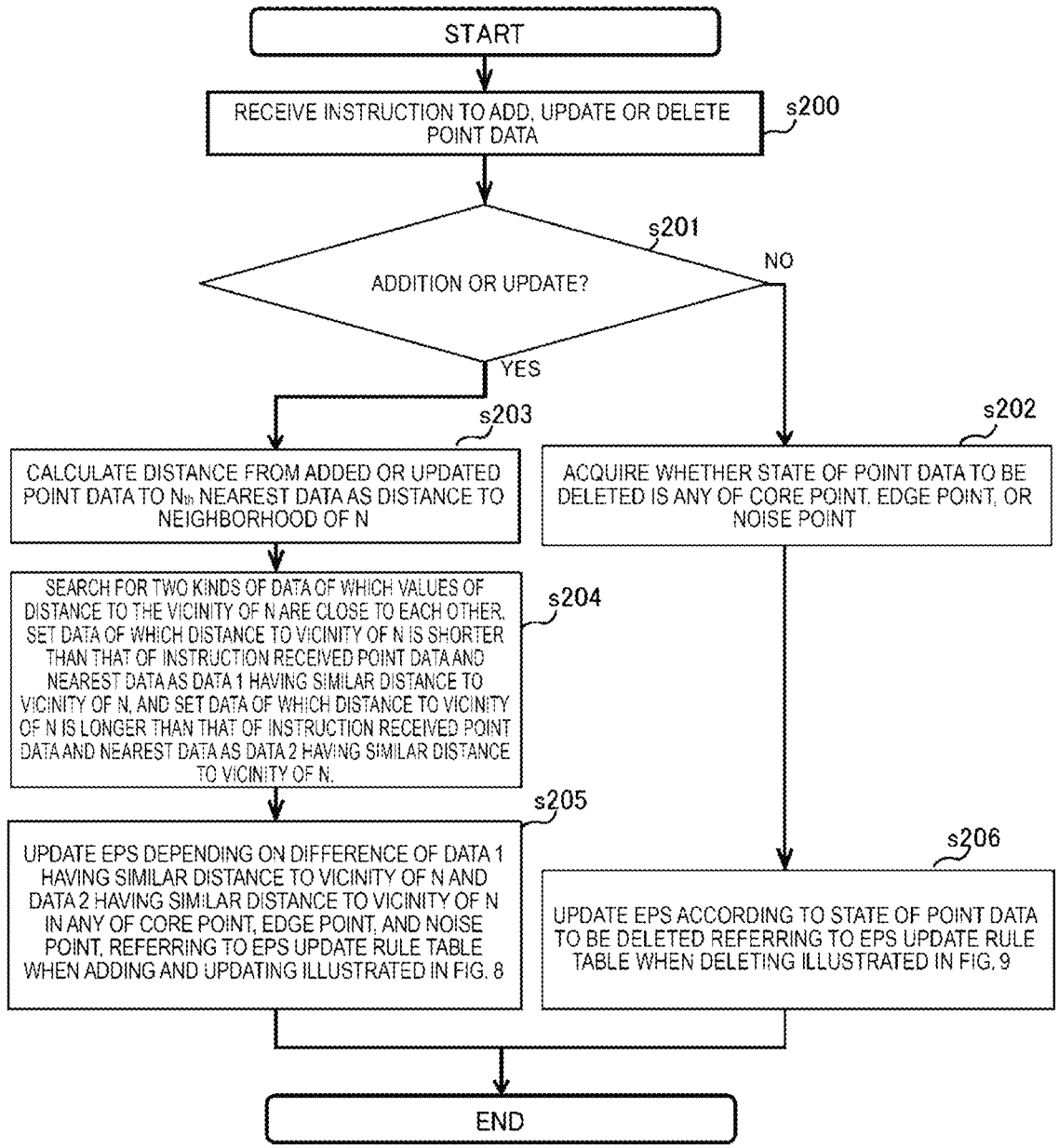

[Fig. 8]

EPS UPDATE RULE TABLE WHEN ADDING AND UPDATING 1021

| # | DATA 1 | DATA 2 | UPDATED EPS DETERMINATION RULE |
|---|---|---|---|
| 1 | CORE POINT OR EDGE POINT | CORE POINT OR EDGE POINT | DISTANCE TO NEIGHBORHOOD OF N OF POINT DATA OTHER THAN NOISE POINT DATA HAVING NEAREST DISTANCE TO NEIGHBORHOOD OF N IS SET AS UPDATED EPS |
| 2 | CORE POINT OR EDGE POINT | NOISE POINT | DISTANCE TO NEIGHBORHOOD OF N OF RECEIVED POINT DATA IS SET AS UPDATED EPS |
| 3 | NOISE POINT | NOISE POINT | DISTANCE TO NEIGHBORHOOD OF N OF NOISE POINT DATA HAVING NEAREST DISTANCE TO NEIGHBORHOOD OF N IS SET AS UPDATED EPS |

DATA 1: DISTANCE TO VICINITY OF N IS SMALLER THAN RECEIVED POINT DATA AND CLOSEST POINT DATA.
DATA 2: DISTANCE TO VICINITY OF N IS LARGER THAN RECEIVED POINT DATA AND CLOSEST POINT DATA.

[Fig. 9]

EPS UPDATE RULE TABLE WHEN DELETING 1022

| # | DELETED DATA | UPDATED EPS DETERMINATION RULE |
|---|---|---|
| 1 | CORE POINT OR EDGE POINT | DISTANCE TO NEIGHBORHOOD OF N OF NOISE POINT DATA HAVING NEAREST DISTANCE TO NEIGHBORHOOD OF N IS SET AS UPDATED EPS |
| 2 | NOISE POINT | DISTANCE TO NEIGHBORHOOD OF N OF OTHER THAN NOISE POINT DATA HAVING NEAREST DISTANCE TO NEIGHBORHOOD OF N IS SET AS UPDATED EPS |

[Fig. 10]
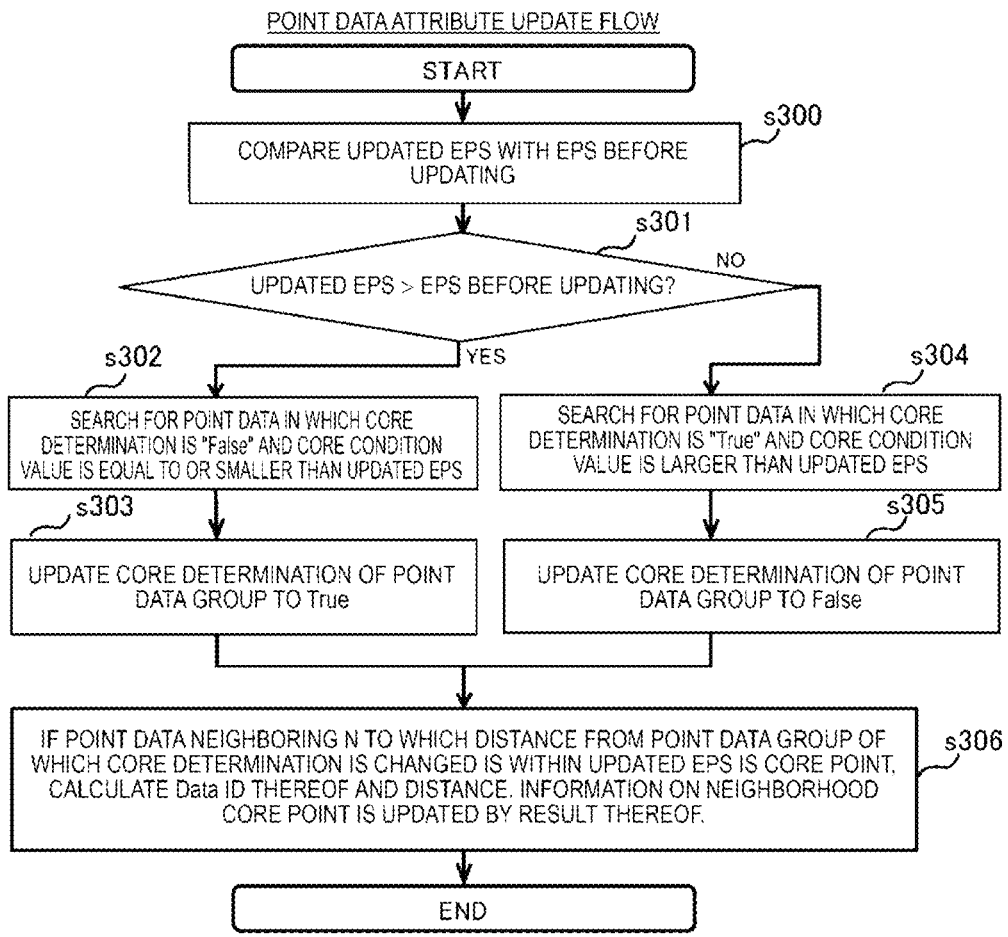
[Fig. 11]
CLUSTER BELONGING TABLE
1111
| Data ID | Cluster ID |
|---------|------------|
| 1 | C1 |
| 2 | C2 |
| 3 | C1 |
| 4 | C3 |
| 5 | C3 |

[Fig. 12]

CLUSTER LABEL TABLE

1121

| Cluster ID | LABEL | STATUS |
|---|---|---|
| C1 | Type A | - |
| C2 | Type B | DIVISION |
| C3 | Type C | - |

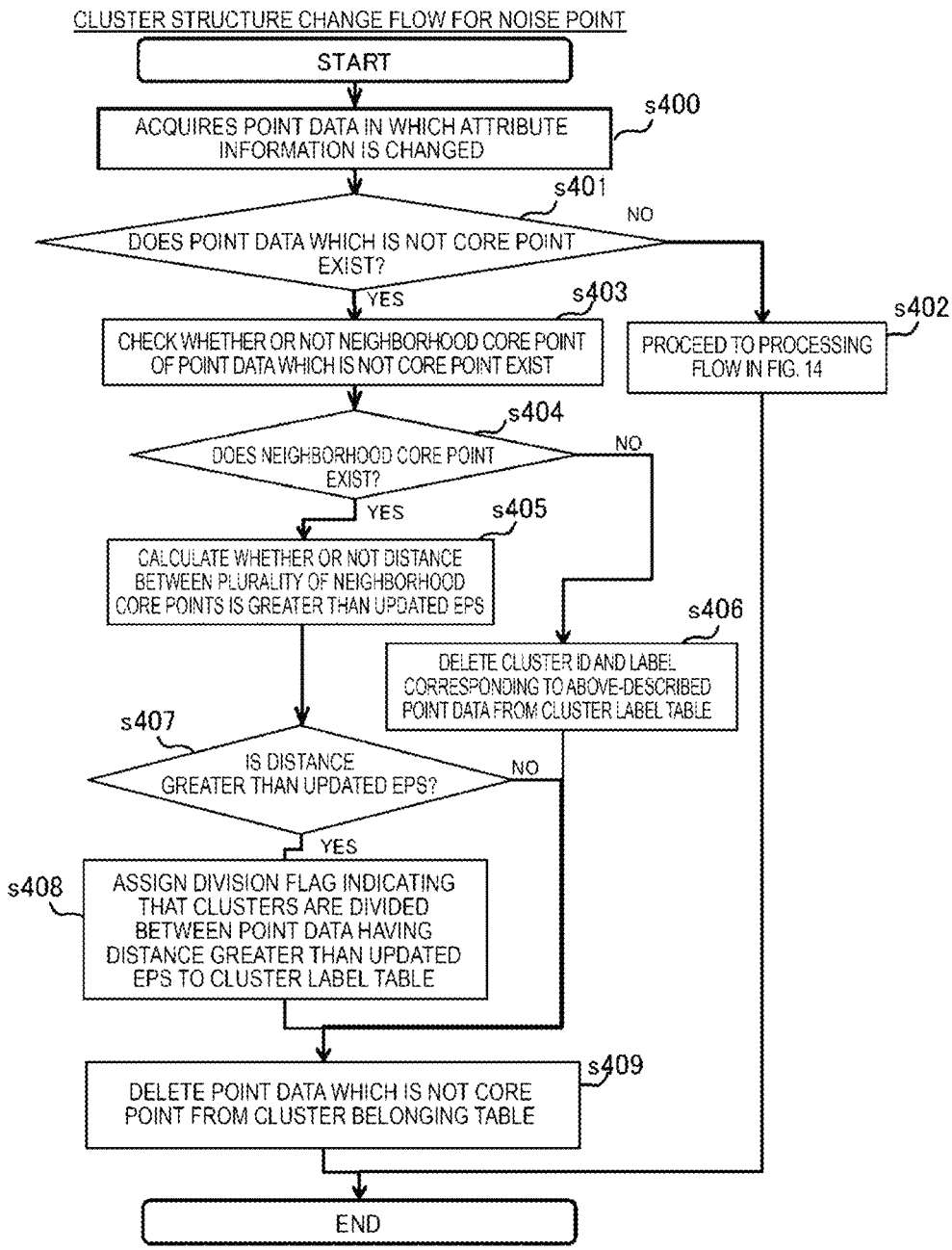
[Fig. 13]

[Fig. 14]
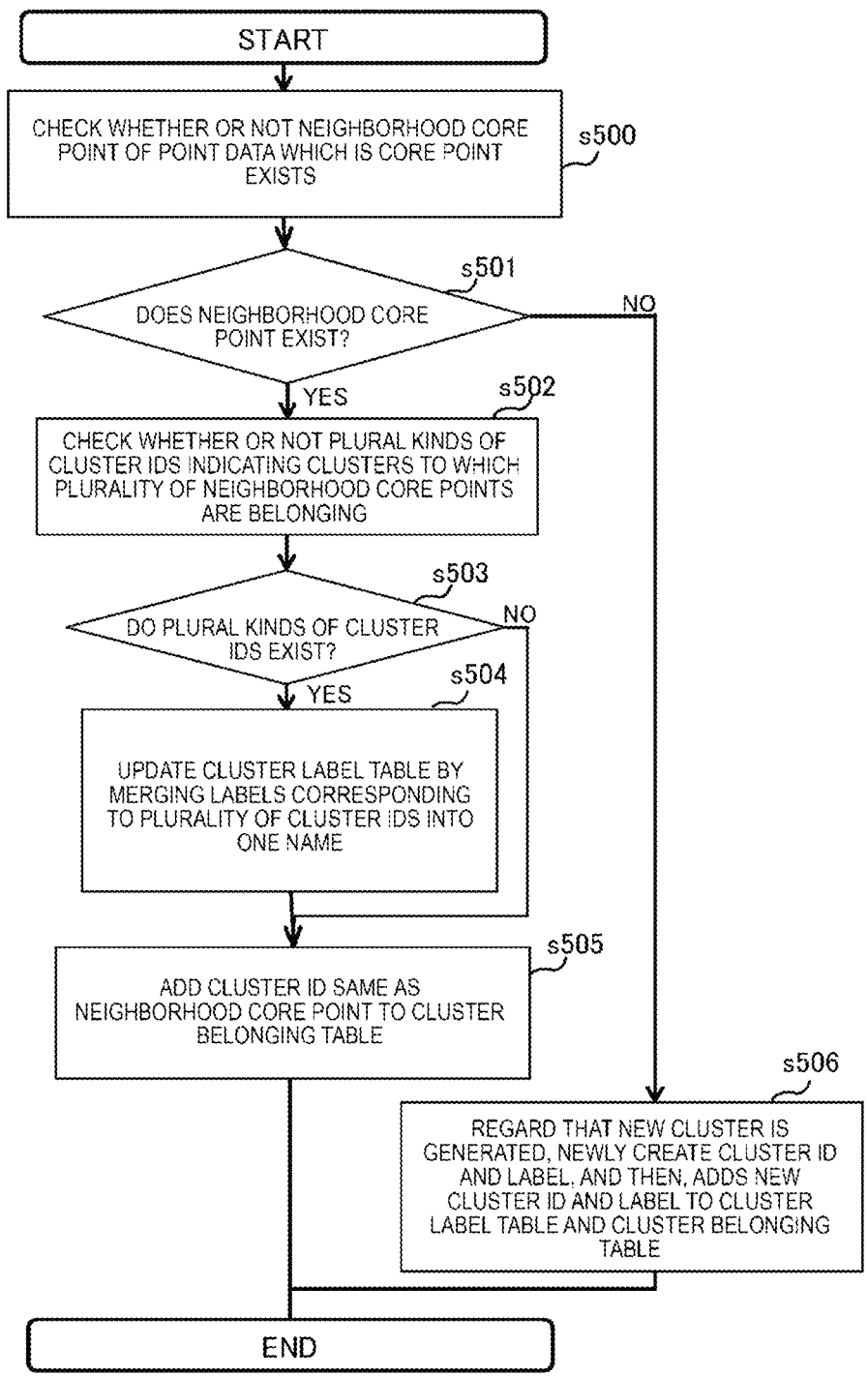

[Fig. 15]
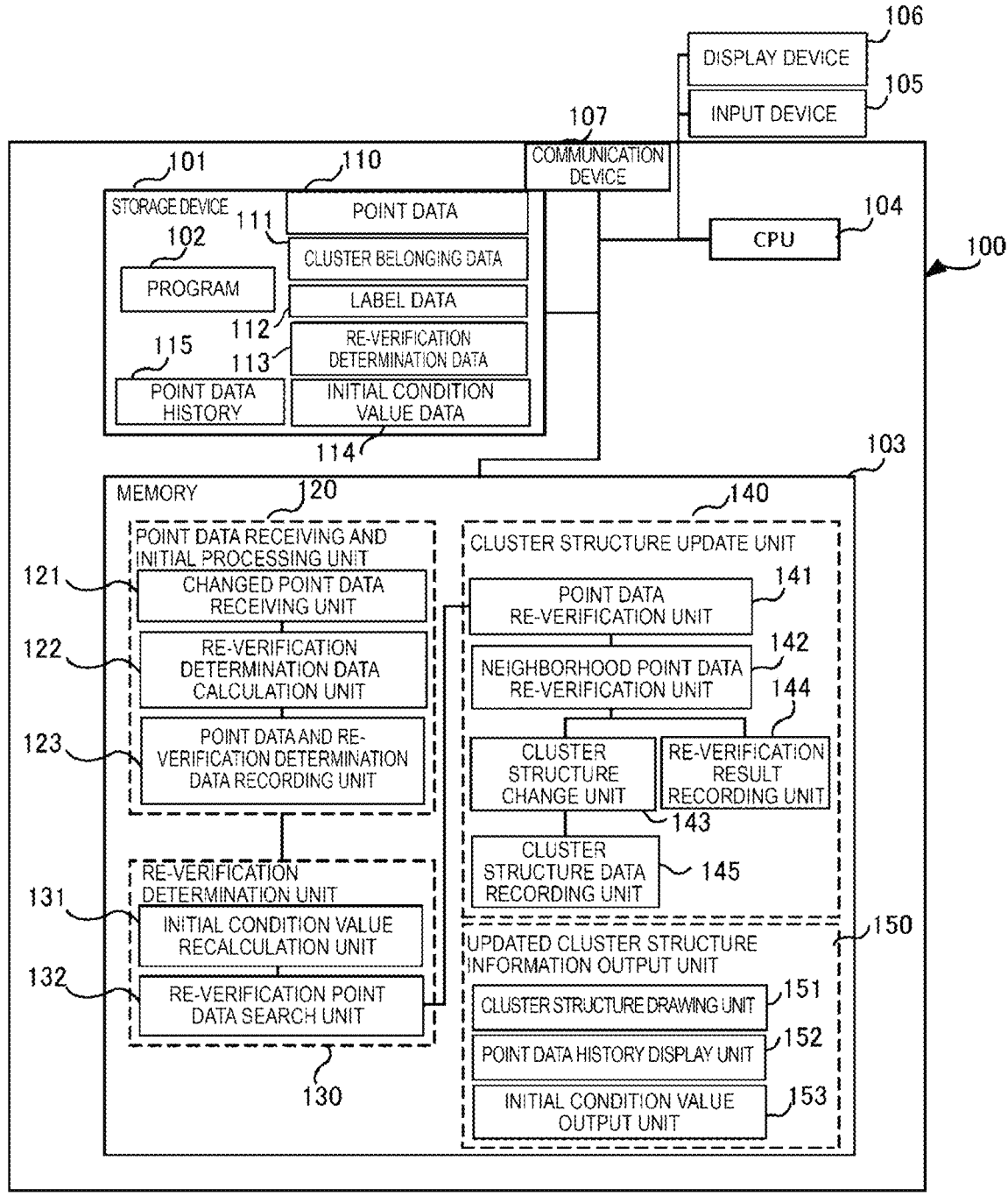

[Fig. 16]
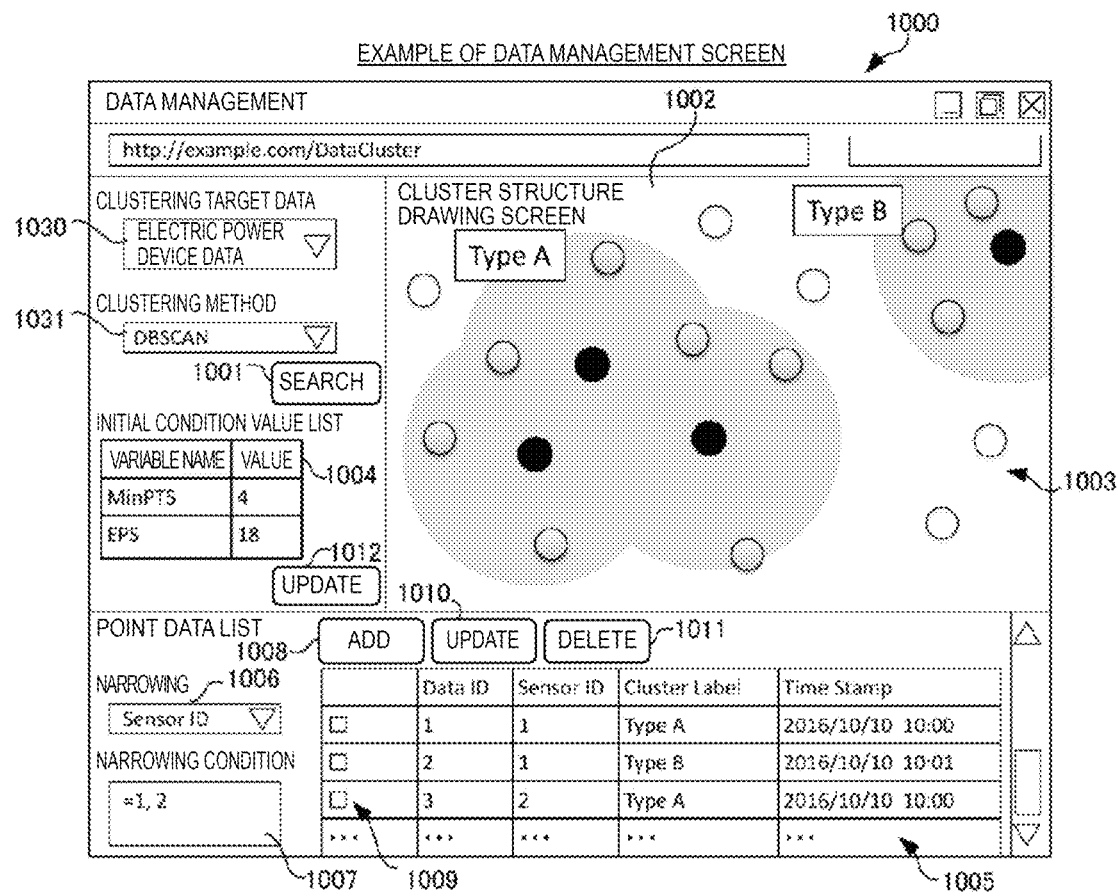

[Fig. 17]
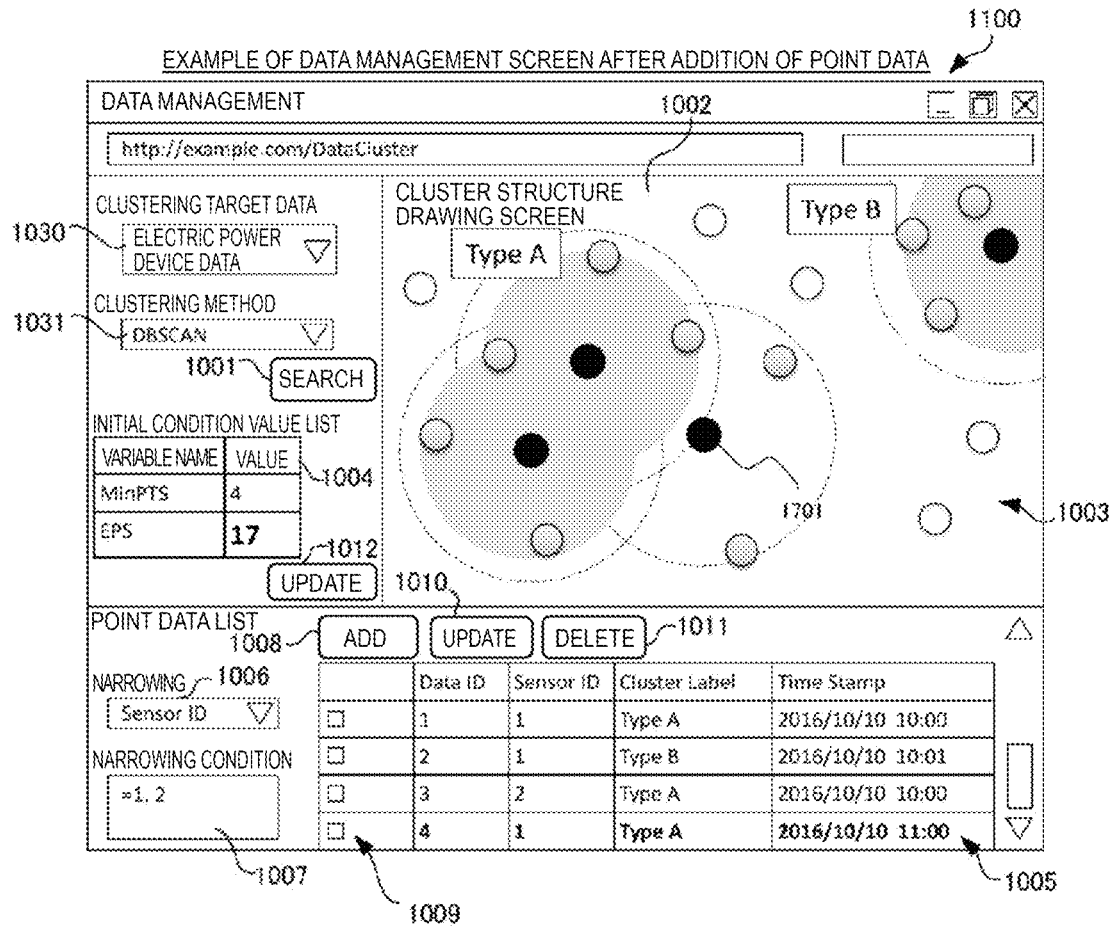
[Fig. 18]
RE-VERIFICATION DETERMINATION DATA FOR HIERARCHICAL TYPE 1131
| Data ID | BELONGING CLUSTER | NEAREST NEIGHBORHOOD CLUSTER | ADJACENT CLUSTER |
|---|---|---|---|
| 1 | c1 | [c2, 10] | [c2, 10], [c3, 15] |
| 2 | c1 | [c2, 10] | [c2, 10], [c3, 18] |
| 3 | c2 | [c1, 15] | [c1, 15] |
| 4 | c3 | [c1, 18] | [c1, 18] |
| 5 | c2 | [c1, 15] | [c1, 13] |

DATA ANALYSIS DEVICE AND DATA ANALYSIS METHOD

CROSS REFERENCE TO PRIOR APPLICATIONS

This application is a U.S. National Phase application under 35 U.S.C. § 371 of International Application No. PCT/JP2017/012439, filed on Mar. 27, 2017. The content of the above application is hereby incorporated by reference.

TECHNICAL FIELD

The present invention relates to a data analysis device and a data analysis method.

BACKGROUND ART

Recent years, with progress of so-called Internet of Things (IoT) technology, various methods have been proposed for periodically acquiring sensor data from facilities or apparatuses and analyzing the sensor data.

As an example of a related art in which the sensor data is sequentially clustered at high speed in the analysis described above, a sequential clustering device (refer to PTL1) or the like is proposed, which performs a density-based spatial clustering of applications with noise (DBSCAN) algorithm under a situation where new point data are sequentially obtained and each time the new point data is input, using clustering processing in which neighborhood point data within a certain distance range is set as a cluster unit with a certain point data as a core. The sequential clustering device includes: determination means for accumulating a cluster structure on which clustering processing is performed in the past, and updating the existing accumulated cluster structure according to the new point data when the new point data is input, and then, determining whether the new point data is the core of the cluster or the neighborhood point data of the new point data is the core of the cluster when the new point data is input; and update means for determining whether the new point data and the neighborhood point data thereof generate any change of appearance of a new cluster, expansion of existing cluster, or combination of the clusters based on the result of determination, and then, updating the existing cluster structure.

CITATION LIST

Patent Literature

PTL1: Japanese Patent No. 5153677

SUMMARY OF INVENTION

Technical Problem

Incidentally, in clustering processing such as hierarchical type, grid type, and density-based type, initial condition values are calculated according to data distribution. However, in the related art, when point data is input, only the neighborhood point data of the point data is taken into consideration and the change in data distribution due to the point data input is not taken into consideration.

In addition, from a viewpoint of data lifecycle management, it is necessary to consider the influence due to the renewal or age-related deterioration of facilities which is the measuring target of sensor data (which is the point data described above). With the renewal or age-related deterioration of the facilities, it is necessary to update or delete the incorrect sensor data generated due to old sensor data or sensor failure. However, in the related art, such update or deletion of the sensor data is not taken into consideration. Therefore, changes in the data distribution due to the update and deletion described above are not taken into consideration.

That is, in the related art, even if the data distribution is changed due to the input (addition), update, or deletion of the point data, the initial condition value of the clustering processing cannot be recalculated to the correct value. For example, in density-based clustering, a region with a data density equal to or greater than a certain threshold value is used as a cluster. This threshold value is the initial condition value, but this cannot be changed in the related art. As a result, there is a problem in that the data to be included in the cluster is included, or the data not to be included is included.

Therefore, an object of the present invention is to realize the update of the cluster structure using the sequential clustering while reflecting the recalculation result of the initial condition value of the clustering due to the change in the data distribution, when the point data is added, updated, or deleted.

Solution to Problem

A data analysis device in the present invention for solving the problems described above performs sequential clustering to update a cluster structure as point data is added to existing clusters calculated from a point data group. The device includes an arithmetic operation device that determines whether or not each point data in the point data group of the existing clusters is a core of the cluster using a predetermined algorithm to calculates a predetermined re-verification determination data, recalculates an initial condition value of the clustering based on the re-verification determination data, specifies re-verification point data which is the point data that becomes no longer the core or becomes a new core by adding the point data, from the point data group to which the addition was made, based on the updated initial condition value obtained by the recalculation, and performs predetermined clustering processing in accordance with the re-verification point data. The above-described "core" has the same meaning as the "core" in PTL1 (the same applies hereinafter).

In addition, in a data analysis method in the present invention, a data analysis device that performs sequential clustering to update a cluster structure as point data is added to existing clusters calculated from a point data group determines whether or not each point data in the point data group of the existing clusters is a core of the cluster using a predetermined algorithm and calculates a predetermined re-verification determination data, recalculates an initial condition value of the clustering based on the re-verification determination data, specifies re-verification point data which is the point data that becomes no longer the core or becomes a new core by adding the point data, from the point data group to which the addition was made, based on the updated initial condition value obtained by the recalculation, and performs predetermined clustering processing in accordance with the re-verification point data.

Advantageous Effects of Invention

According to the present invention, when the point data is added, updated, or deleted, it is possible to realize the update of the cluster structure using the sequential clustering while reflecting the recalculation result of initial condition value of clustering due to the change in the data distribution.

BRIEF DESCRIPTION OF DRAWINGS

FIG. 1 is a diagram illustrating an example of a result of performing DBSCAN.

FIG. 2 is a diagram illustrating an example of determination of DBSCAN initial condition value EPS.

FIG. 3 is diagram illustrating a configuration example of a data analysis device in an embodiment 1.

FIG. 4 is a diagram illustrating an example 1 of a flow in a data analysis method in the embodiment 1.

FIG. 5 is a diagram illustrating an example of re-verification determination data table in the embodiment 1.

FIG. 6 is a diagram illustrating an example of initial condition value update in the embodiment 1.

FIG. 7 is a diagram illustrating a flow example 2 in the data analysis method in the embodiment 1.

FIG. 8 is a diagram illustrating an example of an EPS update rule table when adding and updating in the embodiment 1.

FIG. 9 is a diagram illustrating an example of an EPS update rule table when deleting in the embodiment 1.

FIG. 10 is a diagram illustrating a flow example 3 in the data analysis method in the embodiment 1.

FIG. 11 is a diagram illustrating an example of a cluster belonging table in the embodiment 1.

FIG. 12 is a diagram illustrating an example of a cluster label table in the embodiment 1.

FIG. 13 is a diagram illustrating a flow example 4 in the data analysis method in the embodiment 1.

FIG. 14 is a diagram illustrating a flow example 5 in the data analysis method in the embodiment 1.

FIG. 15 is diagram illustrating a configuration example of a data analysis device in an embodiment 2.

FIG. 16 is a diagram illustrating an example of a data management screen in the embodiment 2.

FIG. 17 is a diagram illustrating an example of the data management screen after adding point data in the embodiment 2.

FIG. 18 is a diagram illustrating an example of hierarchical type re-verification determination data in an embodiment 3.

DESCRIPTION OF EMBODIMENTS

Embodiment 1

Hereinafter, embodiments of the present invention will be described in detail with reference to the drawings. In the present embodiment, it is assumed that a feature amount is extracted from sensor data generated by sensors installed in a facility, and the value of this feature amount is sequentially clustered as point data to be analyzed. If the data analysis method of the present invention is applied to above situation, it becomes possible to sequentially update the cluster structure in data analysis according to the renewal or age-related deterioration of the facilities described above. For example, it is possible to improve the accuracy of abnormal sign determination using the clusters.

In addition, as the feature amounts handled in this embodiment, in addition to the value of sensor data at the time of acquisition, values calculated from the sensor data during a certain period such as a change rate of sensor data, a frequency component, a maximum value, or a minimum value can be used. In addition, as a clustering method, a Density Based Spatial Clustering of Applications with Noise (DBSCAN) is adopted as an example here. In addition, the density as the initial condition value at that time is recalculated according to the event such as addition, update, and deletion of point data.

Hereinafter, the DBSCAN handled here and the method of calculating the initial condition value thereof will be described, and after that, the sequential clustering while considering the update of the initial condition value performed by the data analysis device will be described.

<Regarding the DBSCAN and the Initial Condition Value>

FIG. 1 illustrates an example of a result of performing the DBSCAN. In a feature amount space 1, circles in solid line indicate point data and sets of circles in dashed line are cluster structures 2 (area of the same clusters) calculated as the result of DBSCAN. In the DBSCAN, there are EPS and MinPTS as the initial condition value, and a cluster structure 2 is determined according to a following algorithm.

In the DBSCAN, appropriate point data are selected and an investigation whether or not the point data (point data neighboring N) equal to or greater than MinPTS exist within a distance EPS is performed for the point data. If exists, the target point data is set as core point data, that is, a core point, and point data existing within the distance EPS from the core point, that is, the point data neighboring N are set as edge points. On the other hand, if only the point data less than MinPTS exist within the distance EPS in the above-described selected point data, and is not the core point or the edge point (that is, do not belong to the cluster structure), the point data are set as noise point. Above-described processing is performed for all the point data, and the sets of circles with distance EPS from the core point becomes the cluster structure 2.

If the MinPTS as the initial condition value described above is generally 4 or more, it is known that a result of clustering almost does not change. Therefore, in the present embodiment also, the description will be made with the MinPTS being set to 4.

On the other hand, the EPS changes according to the data distribution of the point data. An example of this EPS determination method is illustrated in FIG. 2. FIG. 2 is a diagram illustrating an example of EPS determination which is an initial condition value in DBSCAN. In the feature amount space 1 in this case, the circles in solid line indicate point data. In addition, pointers to the point data $N_{th}$ closest to each point data and the distance thereto are indicated by arrows and numerical values. In the example in FIG. 2, N is 1, which indicates the distance to the nearest neighborhood point data.

In the DBSCAN, the point data away from any point data is set as the noise, a cluster with high noise immunity is realized. The method of appropriately setting the EPS based on this noise determination is known.

For example, in FIG. 2, it is assumed that the EPS is determined such that a point to which the distance from the point data neighboring N is longer than the EPS is set as the noise. In addition, the point data No. 5 is point data farthest from other point data, and in order to make only this point data No. 5 be a noise, the EPS is set so as not to make the next farthest point data No. 4 be the noise. That is, the distance between the point data No. 4 and the neighborhood of N is set to be EPS. In the example in FIG. 2, the distance 18 becomes the EPS.

<Configuration of the Data Analysis Device>

With the DBSCAN and the determination method of the initial condition value EPS described above as an example, an example of a data analysis device realizing the sequential clustering of the sensor data will be described below. A configuration example of the data analysis device in the present embodiment is illustrated in FIG. 3.

The data analysis device 100 can be realized using a general computer including a storage device 101 such as a hard disk, a memory 103, a CPU 104, an input device 105, a display device 106, and a communication device 107.

Among those, the input device 105 is a device such as a keyboard and a mouse for a user to input instructions. Examples of such instructions include various instructions such as an instruction to start a program, addition of the point data, and confirmation of a result of processing or undo instruction, and the like.

In addition, a display or the like is assumed to be the display device 106. The display device 106 displays a status and a result of the processing performed by the data analysis device 100.

In addition, the CPU 104 is an arithmetic operation device that executes various programs stored in the memory 103 and implements necessary functions.

In addition, the communication device 107 is a device that exchanges various data and commands with other devices via an appropriate network 10 such as a local area network (LAN). In addition, the storage device 101 stores various programs 102 for the data analysis device 100 to perform the processing, a point data generation device 6 that extracts the feature amount from the sensor data generated by the sensor 5, point data 110 indicating the feature amount, cluster belonging data 111 and label data 112 which are results of clustering processing on the point data group, a re-verification determination data table 113 that narrows the point data requiring re-verification in order to update cluster structure by adding the point data, and initial condition value data 114 which is initial condition value of clustering.

In addition, the memory 103 holds various programs 102 that is executed by the data analysis device 100 for performing the processing.

The CPU 104 of the data analysis device 100 reads the program 102 and various data stored in the storage device 101 into the memory 103 and executes the programs. The program 102 includes programs corresponding to the functions of the point data receiving and initial processing unit 120, the re-verification determination unit 130, and the cluster structure update unit 140.

<Data Analysis Device: Processing Flow>

Here, an example of a flow of the data analysis method in the present embodiment 1 will be described. FIG. 4 is an example of a processing flow in which the data analysis device 100 illustrated in FIG. 3 recalculates an initial condition value when the point data is received, and updates the cluster structure if necessary. After describing the outline of the processing flow, details of each processing unit will be described.

First, the point data receiving and initial processing unit 120 of the data analysis device 100 receives any one of the instructions to add, update or delete the point data from the input device 105 (s100).

Thereafter, the point data receiving and initial processing unit 120 determines whether or not the corresponding processing received in s100 is addition or update (s101). As a result of determination, if the corresponding processing is addition or update (YES in s101), the point data receiving and initial processing unit 120 makes the processing proceed to s102.

On the other hand, as the result of above determination, if the corresponding processing is deletion (NO in s101), the point data receiving and initial processing unit 120 makes the processing proceed to s103.

The point data receiving and initial processing unit 120 in s102 calculates re-verification determination data of the point data to be added or updated, and adds the result to the re-verification determination data table 113.

Next, the re-verification determination unit 130 recalculates the initial condition value of clustering (s103). In the example of the DBSCAN, the EPS is recalculated. Thereafter, the re-verification determination unit 130 searches the re-verification determination data table 113 for the point data that matches the initial condition value of clustering recalculated in s103, and sends the result to the cluster structure update unit 140 (s104).

On the other hand, the cluster structure update unit 140 performs the sequential clustering processing on the point data added or updated as described above and the point data searched in s104, and derives the point data adjacent to each point data and the cluster to which the point data belongs (s105).

Thereafter, the cluster structure update unit 140 records a label name of the cluster to which the point data derived in s105 belongs and the data ID and the distance of the point data adjacent to the point data derived in s105 in the re-verification determination data table 113, and ends the processing (s106).

<Data Analysis Device: Details of Each Unit>
<Point Data Receiving and Initial Processing Unit>

In the present embodiment, the point data receiving and initial processing unit 120 of the data analysis device 100 is configured with a changed point data receiving unit 121, a re-verification determination data calculation unit 122, and a point data and a re-verification determination data recording unit 123.

Among those, the changed point data receiving unit 121 receives the point data obtained by the point data generation device 6 by extracting the feature amount from the sensor data of the sensor 5 and performing various analyses from the point data generation device 6 via the communication device 107.

In addition, when performing the sequential clustering processing, the re-verification determination data calculation unit 122 calculates three kinds of data as re-verification determination data in order to perform the re-verification processing based on the point data received from the point data generation device 6 described above. One of them is ID information that uniquely identifies the data. Another one is data for determining whether the point data needs to be subject to the clustering processing again. The other one is a condition for changing the cluster structure after the re-verification. Specific examples of these data will be described later.

In addition, the point data and re-verification determination data recording unit 123 records the point data received from the point data generation device 6 described above and the re-verification determination data in the storage device 101.

<Re-Verification Determination Data>

FIG. 5 illustrates a specific example of the re-verification determination data table 113 when the DBSCAN is adopted as the clustering method. Each record in this re-verification determination data table 113 is re-verification determination data. In each of these records, that is, in each of the re-verification determination data, the data ID indicates an ID that uniquely identifies the point data.

In addition, a core determination and a core condition value are data to determine whether the point data needs to be subject to the clustering processing again. The value of the core determination is "True" if the point data is the core point configuring the cluster, and "False" if the point data is not the core point. On the other hand, the core condition value indicates the condition for the point data to be the core point. Specifically, the point data with data ID=1 is the core point if the EPS is equal to or greater 10, and is not the core point if the EPS is less than 10. The data group neighboring N is pair data in which the data ID of the core point adjacent to this point data and the distance to the point data are grouped as a pair. Here, "adjacent" means that this point data exists at a distance within the EPS.

<Re-Verification Determination Unit>

The re-verification determination unit 130 of the data analysis device 100 in the present embodiment determines the point data required to be re-verified when the sequential clustering is performed using each of the re-verification determination data in the re-verification determination data table 113 described above.

The re-verification determination unit 130 is configured with an initial condition value recalculation unit 131 and a re-verification point data search unit 132. Among those, the initial condition value recalculation unit 131 recalculates the initial condition value for the clustering. In the DBSCAN, the EPS is recalculated as an updated EPS. A specific processing flow will be described later.

In addition, the re-verification point data search unit 132 searches for the point data required to be re-verified using the initial condition value calculated by the initial condition value recalculation unit 131 described above as a search condition. At this time, the re-verification determination data given to each point data is used to determine the matching with the search conditions. Specifically, in the DBSCAN, the point data is not the core point and the point data that changes to the core point due to the updated EPS are searched for. For example, if the EPS is updated to 17 from 18, the point data with data ID=4 in the re-verification determination data table 113 in FIG. 5 is not the core point because the updated EPS becomes less than 18 which is the core condition value. The re-verification point data search unit 132 searches for such point data. In addition, if the EPS is updated to 25 from 18, the point data with data ID=5 becomes the core point because the updated EPS becomes equal to or greater than 25 which is the core condition value. Similarly, the re-verification point data search unit 132 searches for such point data.

<Initial Condition Value Recalculation Unit>

In the initial condition value recalculation unit 131 of the re-verification determination unit 130 described above, if any one of the addition, deletion, or update is performed on the point data in feature amount space 1 illustrated in FIG. 6, the above-described initial condition value is calculated. As illustrated in feature amount space 1 in FIG. 6, point data No. 6 is added and point data No. 5 is deleted, the point farthest from other point data is updated to the point data No. 4, and next farthest point data is the point data No. 6. The EPS is updated to 17, which is the distance between the data No. 6 and the nearest neighborhood point data.

In FIG. 7, a recalculation flow of the initial condition value of clustering performed by the initial condition value recalculation unit 131 will be described. In this case, the initial condition value recalculation unit 131 receives any one of the instructions to add, update or delete the point data from the input device 105 (s200).

If the corresponding processing received in s200 is addition or update (YES in s201), the initial condition value recalculation unit 131 makes the processing proceed to s203.

On the other hand, if the corresponding processing is deletion (NO in s201), the initial condition value recalculation unit 131 makes the processing proceed to s202.

Subsequently, the initial condition value recalculation unit 131 calculates a distance from the added or updated point data to the $N_{th}$ nearest data as a distance to the neighborhood of N (s203).

Thereafter, the initial condition value recalculation unit 131 searches for two kinds of data of which values of the distance to the neighborhood of N are close to each other (s204). In this s204, the initial condition value recalculation unit 131 sets the data of which the distance to the neighborhood of N is shorter than that of the instruction point data received in s200 and the nearest data as data 1 having similar distance to the neighborhood of N, and sets the data of which the distance to the neighborhood of N is longer than that of the instruction point data received in s200 and the nearest data as data 2 having similar distance to the neighborhood of N.

In addition, the initial condition value recalculation unit 131 updates the EPS depending on whether the above-described data 1 having similar distance to the neighborhood of N and data 2 having similar distance to the neighborhood of N are which one of the core point, the edge point, and the noise point, referring to the EPS update rule table 1021 when adding and updating illustrated in FIG. 8 (for example, held in the program of the initial condition value recalculation unit 131 in advance), and then, ends the processing (s205).

On the other hand, in s202, the initial condition value recalculation unit 131 acquires whether the state of the point data to be deleted is any of the core point, the edge point, or the noise point. Thereafter, the initial condition value recalculation unit 131 updates the EPS according to the state of the point data to be deleted referring to the EPS update rule table 1022 illustrated in FIG. 9 when deleting (held in the program of the initial condition value recalculation unit 131 in advance), and then, ends the processing (s206).

<Re-Verification Point Data Search Unit>

If the initial condition value is recalculated and the EPS becomes updated EPS, the re-verification point data search unit 132 searches for the point data required to be re-verified. The data determined to be re-verified is sent to the point data re-verification unit 141, and the point data re-verification unit 141 updates the attribute of the sent point data. This processing will be described with reference to FIG. 5 and FIG. 10.

It is assumed that the re-verification point data search unit 132 compares the updated EPS with the EPS before updating (s300), and searches for the point data required to be re-verified in the cases where the EPS decreases and increases.

If the EPS decreases due to the update, that is, if the EPS before updating>updated EPS (NO in s301), there is a possibility that the point data that is not the core point exists. In order to search for the point data, the re-verification point data search unit 132 searches for the point data in which the core determination in the re-verification determination data table 113 in FIG. 5 is "True" and the core condition value is larger than the updated EPS (s304). In the example in FIG. 5, the point data of data ID=4 is corresponding to such point data.

On the other hand, if the EPS increases due to the update, that is, if the EPS before updating<updated EPS (YES in s301), there is a possibility that the point data which is a new core point exists. Therefore, the re-verification point data search unit 132 searches for the point data in which the core determination in the re-verification determination data table 113 in FIG. 5 is "False" and the core condition value is equal to or smaller than the updated EPS (s302). The re-verification point data search unit 132 sends the information on the searched point data to the cluster structure update unit 140 to update the cluster structure.

<Cluster Structure Update Unit>

In addition, the point data re-verification unit 141 of the cluster structure update unit 140 re-verifies whether the point data searched in s302 and s304 described above, that is, the point data required to be re-verified, is a core point or not. For the point data which is not the core point as a result of this re-verification, the point data re-verification unit 141 updates the core determination of the point data in the corresponding record of the re-verification determination data table 113 to "False" (s305). In addition, for the point data which is not the core point as a result of the re-verification, the point data re-verification unit 141 updates the core determination of the point data in the corresponding record of the re-verification determination data table 131 to "True" (s303).

Thereafter, the point data re-verification unit 141 updates the data group neighboring N of the re-verification determination data illustrated in FIG. 5 from the relationship between the point data of which the core determination is changed as described above and the neighborhood point data of the corresponding point data. Specifically, the point data re-verification unit 141 searches whether or not the point data neighboring N to which the distance from the point data of the point data group of which the core determination is changed is within the updated EPS is the core point, and if the point data neighboring N is the core point, then, calculates the data ID thereof and the distance (s306). In addition, the point data re-verification unit 141 sets the pair of the data ID and the distance calculated in s306 as pair data, and if the pair data is not in the data group neighboring N corresponding to each point data in the re-verification determination data table 113 in FIG. 5, adds the pair data to the re-verification determination data table 113.

<Re-Verification Result Recording Unit>

According to the processing described above by the point data re-verification unit 141 and the neighborhood point data re-verification unit 142, the attributes and the re-verification determination data of the re-verification point data are updated. The result of update is recorded by the re-verification result recording unit 144. In this way, if the data is added, deleted, or updated again, the re-verification determination and the cluster structure are updated based on the attributes and the re-verification determination data of the latest point data.

<Cluster Structure Change Unit>

The cluster structure change unit 143 changes the cluster structure according to the attribute of each point data updated by the point data re-verification unit 141 and the neighborhood point data re-verification unit 142. The processing described above will be described with reference to FIG. 11, FIG. 12, and processing flows in FIG. 13, and FIG. 14.

After the re-verification described above, if the point data is a noise point or an edge point, depending on whether the data group neighboring N indicated in the re-verification determination data table 113 in FIG. 5 is the core point or not, the cluster may be changed in three ways: disappearance, reduction, or division. After the re-verification described above, if the point data is determined to be a core point, the cluster may be changed in three ways: generated, extended, or coupled. Hereinafter, the core point in a case where the data group neighboring N indicated in the re-verification determination data table 113 in FIG. 5 will be referred to as a neighborhood core point. Hereinafter, the descriptions will be made with reference to the cluster structure change flow in FIG. 13 and FIG. 14, respectively.

<Processing Flow in FIG. 13>

First, the cluster structure change unit 143 acquires point data in which attribute information is changed (s400). Thereafter, whether or not point data which is not a core point exists is determined (s401), and if the point data exists (YES in s401), the cluster structure change unit 143 makes the processing to proceed to s403, and on the other hand, if the point data does not exist (NO in s401), the cluster structure change unit 143 makes the processing to proceed to a processing flow in FIG. 14 (s402).

In addition, the cluster structure change unit 143 checks whether or not the neighborhood core point of the point data which is not a core point exists (s403). As a result of determination, if the neighborhood core point of the point data which is not the core point exists (YES in s404), the cluster structure change unit 143 makes the processing to proceed to s405. On the other hand, as a result of determination, if the neighborhood core point of the point data which is not the core point does not exist (NO in s404), the cluster structure change unit 143 makes the processing to proceed to s406.

Subsequently, the cluster structure change unit 143 calculates whether or not the distance between the plurality of neighborhood core points is greater than the updated EPS (s405), and as a result, if the distance between the plurality of neighborhood core points is greater than the updated EPS (YES in s407), the cluster structure change unit 143 makes the processing to proceed to s408.

On the other hand, if the distance between the plurality of neighborhood core points is not greater than the updated EPS (NO in s407), the cluster structure change unit 143 makes the processing to proceed to s409.

Next, the cluster structure change unit 143 deletes the cluster ID and the label corresponding to the above-described point data from the cluster label table 1121 (s406), and makes the processing proceed to s409.

In addition, the cluster structure change unit 143 deletes the point data which is not the core point from the cluster belonging table 1111 (s409), and ends the processing.

<Processing Flow in FIG. 14>

The processing flow in FIG. 14 is executed upon receiving the result of s402 in the flow chart in FIG. 13 described above. First in this case, the cluster structure change unit 143 checks whether or not the neighborhood core point of the point data which is the core point exists (s500).

As a result of above-described checking, if the neighborhood core point exists (YES in s501), the cluster structure change unit 143 makes the processing proceed to s502. On the other hand, if the neighborhood core point does not exist (NO in s501), the cluster structure change unit 143 makes the processing proceed to s506.

Next, the cluster structure change unit 143 checks whether or not a plural kinds of cluster IDs indicating the clusters to which a plurality of neighborhood core points are belonging exists (s502). As a result of checking, if plural kinds of cluster IDs exist (YES in s503), the cluster structure change unit 143 makes the processing to proceed to s504. On the other hand, if plural kinds of cluster IDs do not exist (NO in s503), the cluster structure change unit 143 makes the processing proceed to s505.

The cluster structure change unit 143 updates the cluster label table 1121 by merging the labels corresponding to the plurality of cluster IDs into one name (s504), and makes the processing proceed to s505.

Next, the cluster structure change unit 143 adds the cluster ID same as the neighborhood core point to the cluster belonging table 1111 (s505), and ends the processing.

In addition, it is regarded that a new cluster is generated, the cluster structure change unit 143 newly creates a cluster ID and a label, and adds the new cluster ID and label to the cluster label table 1121 and the cluster belonging table 1111 (s506), and then, ends the processing.

<Cluster Structure Data Recording Unit>

A cluster structure data recording unit 145 of the cluster structure update unit 140 records the belongings of each point data described above in the cluster belonging table 1111 in FIG. 11 and records the label name of each cluster in the cluster label table 1121 in FIG. 12.

First, recording in the cluster belonging table 1111 illustrated in FIG. 11 will be described. Each point data has ID information (cluster ID) of the cluster to which the point data belongs, and each ID corresponds to the label illustrated in the cluster label table 1121 in FIG. 12.

In addition, if the point data is a core point or an edge point, the cluster structure change unit 143 adds the cluster ID of the cluster to which the point data belongs, into the cluster belonging table 1111 in FIG. 11 together with the data ID of the point data. On the other hand, if the point data is a noise point, it is regarded that a cluster to which the point data belongs does not exist, the cluster structure change unit 143 deletes the row of data ID corresponding to the point data from the cluster belonging table 1111 in FIG. 11.

Next, the recording into the cluster label table 1121 illustrated in FIG. 12 will be described. The recording into the cluster label table 1121 is performed in four cases of cluster structure generation, disappearance, coupling, and division. In a case of generation of the cluster structure, the cluster structure data recording unit 145 newly generates a cluster ID which is uniquely identifiable in the cluster label table 1121 and assigns a label name to the cluster structure. On the other hand, in a case of disappearance of the cluster structure, the cluster structure data recording unit 145 deletes the corresponding cluster ID and label name from the cluster label table 1121. In addition, in the cluster label table 1121, in a case of coupling of the cluster structure, the cluster structure data recording unit 145 updates all the label names in the cluster label table 1121 associated with the plurality of cluster IDs of the coupling target to one label name after coupling. In addition, in a case of division of the cluster structure, the cluster structure data recording unit 145 assigns information indicating the division to the cluster ID to be divided. Thereafter, referring to the cluster belonging table 1111, the cluster structure data recording unit 145 investigates which cluster each point data after the division belongs to, and updates the cluster ID in the cluster belonging table 1111 illustrated in FIG. 11 to a newly identifiable cluster ID, and then, adds a combination of the new cluster ID and the label to the cluster label table 1121 in FIG. 12. After the update described above, the cluster structure data recording unit 145 deletes the information on the combination of the cluster ID and the label name to which the information indicating the division is assigned from the cluster label table 1121. This processing at the time of division may be performed during the processing by the cluster structure change unit 143, or may be performed during the time when the next new point data is received after the processing by the cluster structure change unit 143 ends, and the next cluster structure change processing is performed.

Embodiment 2: Data Manager

In the embodiment 1, as illustrated in FIG. 3, the data analysis device 100 is configured to receive the point data via the communication device 107. On the other hand, in the embodiment 2, in the configuration of the data analysis device 100 for the data manager illustrated in FIG. 15, it is assumed that a data manager adds, updates, and deletes the point data recorded in the storage device 101 via the input device 105.

In this case, the data manager can delete the data that becomes old due to the renewal or the age-related deterioration of the sensor data acquisition device, or can update the data incorrectly recorded due to the sensor failure. Furthermore, it is possible to confirm the addition, update, and deletion of these point data and the accompanying cluster structure changes through a data management screen (will be described later).

In the configuration of the data analysis device 100 for the data manager in FIG. 15, an updated cluster structure information output unit 150 is added to the data analysis device in FIG. 3.

The updated cluster structure information output unit 150 includes a cluster structure drawing unit 151 that draws a cluster structure calculated from the point data 110 stored in the storage device 101, a point data history display unit 152 that displays the date and time of the addition, update and deletion of the point data, and an initial condition value output unit 153 that outputs various parameters which are initial condition values when performing the clustering processing. In addition, the storage device 101 stores the point data history 115.

Hereinafter, an example will be described referring to the example of a data management screen 1000 in FIG. 16, in which the above-described data manager performs the operation of adding, updating and deleting the point data constituting the cluster structure through the input device 105, and accordingly, the data analysis device 100 for the data manager updates the shape of the cluster structure.

The data manager browses the data management screen 1000 illustrated in FIG. 16 on the display device 106, and selects the type of data to be managed from the clustering target data selection field 1030 by operating the input device 105. In addition, the data manager searches the clustering method field 1031 for the clustering processing performed for each data type selected as described above, and presses the search button 1001.

The data analysis device 100 for the data manager receiving the pressing displays the cluster structure 1003 on the cluster structure drawing screen 1002 and displays an initial condition value list 1004 for the clustering processing. In addition, the data analysis device 100 for the data manager displays a point data list 1005 which is a list of clustering target point data at the bottom of the data management screen 1000. The point data list 1005 is configured to include of a data ID uniquely identifying the point data, a sensor ID indicating the sensor that generated the point data, a cluster label indicating the label name of the cluster to which the point data belongs, and a time stamp indicating the time at which the corresponding point data is recorded.

The data manager operates the input device 105 to select each item of data ID, sensor ID, cluster label, and time stamp described above in the point data list 1005 described above using an interface 1006 for narrowing the relevant items, and sets the condition value of the corresponding item in a narrowing condition field 1007. It is possible to narrow down the data displayed in the point data list 1005 by performing above-described setting.

In addition, by the above-described data manager operating the input device 105 and pressing an addition button 1008, for example, the input interface of the point data is called out, and it is possible to perform the addition of the point data via the input interface. Furthermore, by the data manager checks a check box 1009 attached to the point data list 1005 and pressing an update button 1010 or a delete button 1011, it is possible to perform various operations such as update or deletion of the point data.

After performing the operations such as addition, update, and deletion of the point data as described above, the data manager instructs the data analysis device 100 for the data manager to recalculate the initial condition value and to perform the sequential clustering processing described in embodiment 1 by pressing the update button 1012. The data analysis device 100 for the data manager performs the corresponding processing according to the instruction and redraws the result on the data management screen 1000.

An example of the result of redrawing by the data analysis device 100 for the data manager when the data manager performs the operation of adding the point data to the point data list 1005 is illustrated in the data management screen 1100 in FIG. 17. If the point data is added, updated, or deleted, the initial condition value and the cluster structure in the clustering processing are updated by the processing performed by the data analysis device 100 (embodiment 1).

In the example of the DBSCAN, the EPS on the data management screen 1000 in FIG. 16 is "18" in the initial condition value list 1004, and with the addition of the point data, the EPS on the data management screen 1100 in FIG. 17 is updated to "17". In addition, the cluster structure is also updated accordingly. In the example of the data management screen 1100 illustrated in FIG. 17, on the cluster structure drawing screen 1002, the dashed line indicates the cluster structure before the EPS update, and the gray part indicates the cluster structure when EPS is updated to "17".

In the cluster structure in this case, since the EPS of the cluster labeled as "Type A" becomes small, the point data of equal to or greater than MinPTS does not exist around the corresponding point data (1701), and thus, the cluster is reduced.

In this way, the data manager performs addition, update, and deletion of the point data using the data management screen 1100, and can confirm the change of the cluster structure, which is the result thereof, from the data management screen 1100 without waiting for the recalculation of all the data.

The result of processing when the data manager presses the update button 1012 may be regarded as temporary, and a confirm button to fix the result of confirmation by the data manager may be provided on the data management screen 1000 or 1100. Furthermore, in order to indicate a correspondence relationship between the point data list 1005 and the cluster structure drawing screen 1002, each data list and each point data having the correspondence relationship may be drawn with a predetermined corresponding color. In addition, the data of which the time stamp is before or after a specific time point may be drawn with a predetermined color indicating the old or new data.

Embodiment 3: Hierarchical Clustering

In the embodiment 1, the data analysis device 100 is configured to sequentially perform the clustering using the density-based DBSCAN. On the other hand, in an embodiment 3, an example of the data analysis device 100 that sequentially performs hierarchical clustering will be described.

In the hierarchical clustering, the similarity between clusters is calculated, the most similar clusters are merged, and the processing described above is repeated until all the clusters become one cluster. At this time, the similarity of clusters in each hierarchy constituting the cluster hierarchy is changed by the addition, update, and deletion of the point data.

Therefore, in order to reduce the amount of calculation by narrowing down the clusters of which the similarity is changed, a data analysis device 100 includes a re-verification determination data table 1131 for hierarchical type illustrated in FIG. 18 instead of the re-verification determination data table 113.

In this re-verification determination data table 1131 for hierarchical type, one line of re-verification determination data is held for each point data. The data ID is an ID indicating the point data uniquely, and the belonging cluster is the cluster to which the point data belongs. In addition, a nearest neighborhood cluster represents a cluster that is most similar to the belonging cluster and a distance therebetween. Using this, it is possible to express which cluster is to be merged. In addition, an adjacent cluster represents a list of clusters that exist in the same hierarchy and the distances indicating the similarities thereof.

If the point data is added, updated, or deleted, the data analysis device 100 searches for a belonging cluster in which the change occurs due to the point data, and recalculates the distance between the belonging cluster and the nearest neighborhood cluster. In this way, if the distance between the belonging cluster and the nearest neighborhood cluster increases, the data analysis device 100 searches for a cluster of re-merging destination from the cluster most similar to the adjacent cluster.

The present invention is not limited to the embodiments described above, but includes various variations. For example, the embodiments described above have been described in detail for the purpose of clarity of the invention, and not limited to a device that necessarily includes all the described configurations. In addition, a part of the configurations in a certain embodiment can be replaced by the configurations in another embodiment, and the configurations in a certain embodiment can also be added to the configurations in another embodiment. In addition, other configurations can be added to, deleted from, and replaced to a part of the configurations in each embodiment. In addition, all or a part of the above-described configurations, functions, processing units, processing means, and the like can be realized by hardware designed in an integrated circuit, for example. In addition, the configurations and functions described above may be realized by software, in which a processor interprets and executes programs that realize those functions. Information such as programs that realize each function, tables, and files can be stored in a memory, a hard disk, a recording device such as a solid state drive (SSD), or a recording medium such as an IC card, an SD card, or a DVD.

According to the data analysis device in the present embodiment, when the point data is added, updated, or deleted, the updating of the cluster structure reflecting the recalculation result of the initial condition value of clustering due to the change of the data distribution, can be realized by the sequential clustering.

At least followings are known by the disclosure in the present specification. That is, in the data analysis device in the present embodiment, the arithmetic operation device may search for neighborhood core point data which is another core different from the re-verification point data from the existing clusters having the re-verification point data as a center, cause the existing clusters having the re-verification point data as a center to disappear if the neighborhood core point data does not exist as a result of the search, reduce the existing clusters including the neighborhood core point data if one of the neighborhood core point data exists and the re-verification point data and the neighborhood core point data are in a predetermined neighborhood relationship, and divide each of the corresponding clusters if a plurality of pieces of neighborhood core point data exist and each piece of the re-verification point data and the neighborhood core point data are not in the predetermined neighborhood relationship.

According to this, it becomes possible to efficiently and accurately perform the clustering such as disappearance, reduction, and division of the existing clusters, which cannot be performed in the related art, in accordance with the update of the initial condition values such as EPS accompanying the addition of the point data.

In addition, in the data analysis device in the present embodiment, the arithmetic operation device may search for neighborhood core point data included in the updated cluster if the re-verification point data which is the point data not included in the existing clusters is included in an updated cluster based on an updated initial condition value obtained by the recalculation, generate a cluster having the re-verification point data as a center which is the point data not included in the existing clusters if the neighborhood core point data does not exist as a result of the search, expands corresponding cluster if the neighborhood core point data exists and the re-verification point data and the neighborhood core point data are in a predetermined neighborhood relationship, and couple the corresponding clusters if the neighborhood core point data exists and the re-verification point data and the neighborhood core point data are not in a predetermined neighborhood relationship.

According to this, it becomes possible to more efficiently and accurately perform the clustering such as the generation, expansion, and coupling of existing clusters in accordance with the update of the initial condition values such as the EPS in conjunction with the addition of point data.

In addition, in the data analysis device in the present embodiment, the arithmetic operation device may further perform processing for causing a predetermined output device to display a data management screen, performing any of predetermined processing of adding, updating, or deleting the clustering target point data according to a user's instruction received in the data management screen, and displaying a result of a change in the initial condition value due to the recalculation according to the addition, update, or deletion of the point data and a result of a change in the cluster structure according to the change in the initial condition value, on the output device, and processing for returning the initial condition value and the cluster structure indicated in the result to the initial condition value and cluster structure before any processing of the addition, update, or deletion of the point data if a user's instruction to confirm or cancel each of the results displayed as above is received.

According to this, the content of the update of the initial condition value such as the EPS in accordance with the present embodiment and the update of the cluster accompanying the above update are visually displayed to the user, and it becomes possible to confirm and reflect the appropriate user's intention such as an approval or denial.

In addition, in the data analysis device in the present embodiment, for a hierarchical clustering, the arithmetic operation device may calculate a belonging cluster to which each point data belongs, a most similar nearest neighborhood cluster to which the belonging cluster is merged, and the adjacent cluster existing in the same hierarchy as re-verification determination data and hold the result in a predetermined storage device, and if any one of the addition, update, or deletion of point data is performed, specify a cluster in which a change occurs due to the point data using the re-verification determination data, and specify a re-merging destination of a cluster from the adjacent cluster in the re-verification determination data.

According to this, the data analysis method in the present embodiment can be applied not only to the non-hierarchical clustering but also to the hierarchical clustering.

In addition, in the data analysis method in the present embodiment, the data device may search for neighborhood core point data which is another core different from the re-verification point data from the existing clusters having the re-verification point data as a center, cause the existing clusters having the re-verification point data as a center to disappear if the neighborhood core point data does not exist as a result of the search, reduce the existing clusters including the neighborhood core point data if one of the neighborhood core point data exists and the re-verification point data and the neighborhood core point data are in a predetermined neighborhood relationship, and divide each of the corresponding clusters if a plurality of pieces of neighborhood core point data exist and the re-verification point data and each piece of the neighborhood core point data are not in the predetermined neighborhood relationship.

In addition, in the data analysis method in the present embodiment, the data analysis device may search for neighborhood core point data included in the updated cluster if the re-verification point data which is the point data not included in the existing clusters is included in an updated cluster based on an updated initial condition value obtained by the recalculation, generate a cluster having the re-verification point data as a center which is the point data not included in the existing clusters if the neighborhood core point data does not exist as a result of the search, expands corresponding cluster if the neighborhood core point data exists and the re-verification point data and the neighborhood core point data are in a predetermined neighborhood relationship, and couple the corresponding clusters if the neighborhood core point data exists and the re-verification point data and the neighborhood core point data are not in a predetermined neighborhood relationship.

In addition, in the data method in the present embodiment, the data analysis device may further perform processing for causing a predetermined output device to display a data management screen, performing any of predetermined processing of adding, updating, or deleting the clustering target point data according to a user's instruction received in the data management screen, and displaying a result of a change in the initial condition value due to the recalculation according to the addition, update, or deletion of the point data and a result of a change in the cluster structure according to the change in the initial condition value, on the output device, and processing for returning the initial condition value and the cluster structure indicated in the result to the initial condition value and cluster structure before any processing of the addition, update, or deletion of the point data if a user's instruction to confirm or cancel each of the results displayed as above is received.

In addition, in the data analysis method in the present embodiment, for a hierarchical clustering, the data analysis device may calculate a belonging cluster to which each point data belongs, a most similar nearest neighborhood cluster to which the belonging cluster is merged, and the adjacent cluster existing in the same hierarchy as re-verification determination data and hold the result in a predetermined storage device, and if any one of the addition, update, or deletion of point data is performed, specify a cluster in which a change occurs due to the point data using the re-verification determination data, and specify a re-merging destination of a cluster from the adjacent cluster in the re-verification determination data.

REFERENCE SIGNS LIST 1 feature amount space
2 cluster structure
5 sensor
6 point data generation device
10 network
100 data analysis device
101 storage device
102 program
1021 EPS update rule table when adding and updating
1022 EPS update rule table when erasing (removing)
103 memory
104 CPU (arithmetic operation device)
105 input device
106 display device
107 communication device
110 point data
111 cluster belonging data
1111 cluster belonging table
1121 cluster label table
112 label data
113 re-verification determination data table
1131 re-verification determination data table for hierarchical type
114 initial condition value data
115 point data history
120 point data receiving and initial processing unit
121 changed point data receiving unit
122 re-verification determination data calculation unit
123 point data and re-verification determination data recording unit
130 re-verification determination unit
131 initial condition value recalculation unit
132 re-verification point data search unit
140 Cluster structure update unit
141 point data re-verification unit
142 neighborhood point data re-verification unit
143 cluster structure change unit
144 re-verification result recording unit
145 cluster structure data recording unit
150 updated cluster structure information output unit
151 cluster structure drawing unit
152 point data history display unit
153 initial condition value output unit
1000, 1100 data management screen

The invention claimed is:

1. A data analysis device that performs sequential clustering on a point data group comprising point data extracted from one or more sensors to update one or more cluster structures in a cluster group calculated from the point data group, the data analysis device comprising:
a processor that
determines, for an existing cluster group calculated from point data in the point data group, whether or not each point data in the point data group is a core of an updated cluster structure using a predetermined algorithm to calculate a predetermined re-verification determination data,
recalculates one or more initial condition values of one or more updated cluster structures based on the re-verification determination data,
specifies re-verification point data based on the recalculated initial condition values of the one or more updated cluster structures, and
searches for neighborhood core point data included in the updated one or more clusters cluster structures based on the recalculated initial condition values, wherein:
based on the search, if neighborhood core point data does not exist, the processor generates a cluster structure having the re-verification point data as a center,
based on the search, if neighborhood core point data does exist and the re-verification point data and the neighborhood core point data are in a predetermined neighborhood relationship, the arithmetic operation device processor extends corresponding cluster structures,
based on the search, if neighborhood core point data does exist and the re-verification point data and the neighborhood core point data are not in a predetermined neighborhood relationship, the processor couples corresponding cluster structures,
wherein for a hierarchical clustering, the processor calculates a belonging cluster structure to which each point data belongs, a most similar nearest neighborhood cluster structure to which the belonging cluster structure is merged, and an adjacent cluster structure existing in the same hierarchy as re-verification determination data, and holds the result in a predetermined storage device, and wherein if any one of addition, update, or deletion of point data is performed, the processor specifies a cluster structure in which a change occurs due to the point data using the re-verification determination data, and specifies a re-merging destination of a cluster structure from the adjacent cluster structure in the re-verification determination data.

2. The data analysis device according to claim 1, wherein the processor searches for neighborhood core point data which is another core different from the re-verification point data from the existing cluster structures having the re-verification point data as a center,
wherein if neighborhood core point data does not exist, the processor causes the existing cluster structures having the re-verification point data as a center to disappear,
wherein if one of the neighborhood core point data exists and the re-verification point data and the neighborhood core point data are in a predetermined neighborhood relationship, the processor reduces the existing cluster structures including the neighborhood core point data and,
wherein if a plurality of pieces of neighborhood core point data exist and the re-verification point data and each piece of the neighborhood core point data are not in the predetermined neighborhood relationship, the processor divides each of the corresponding cluster structures.

3. The data analysis device according to claim 1, wherein the processor further performs processing for causing a predetermined output device to display a data management screen, any of predetermined processing of adding, updating, or deleting clustering target point data according to a user's instruction received in the data management screen, and displaying on the output device:
- a result of a change in an initial condition value of a cluster structure due to a recalculation according to the addition, update, or deletion of point data and
- a result of a change in the cluster structure according to the change in the initial condition value of the cluster structure, and processing for returning the initial condition value of the cluster structure and the cluster structure indicated in the result of a change in the initial condition value and the result of a change in a cluster structure before any processing of the addition, update, or deletion of the point data if a user's instruction to confirm or cancel each of the displayed results is received.

4. A data analysis method in which a data analysis device comprising a processor performs sequential clustering on a point data group comprising point data extracted from one or more sensors to update one or more cluster structures in a cluster group calculated from the point data group, the method comprising determining, for an existing cluster group calculated from the point data group, whether or not each point data in the point data group is a core of an updated cluster structure using a predetermined algorithm to calculate a predetermined re-verification determination data, recalculating one or more initial condition values of one or more updated clusters cluster structures based on the re-verification determination data, specifying re-verification point data based on the recalculated initial condition values of the one or more updated cluster structures, and searching for neighborhood core point data included in the updated one or more cluster structures based on the recalculated initial condition values, wherein:
- based on the search, if neighborhood core point data does not exist, the processor generates a cluster structure having the re-verification point data as a center;
- based on the search, if neighborhood core point data does exist and the re-verification point data and the neighborhood core point data are in a predetermined neighborhood relationship, the processor extends corresponding cluster structures;
- based on the search, if neighborhood core point data does exist and the re-verification point data and the neighborhood core point data are not in a predetermined neighborhood relationship, the processor couples corresponding cluster structures, and for a hierarchical clustering, calculating a belonging cluster structure to which each point data belongs, a most similar nearest neighborhood cluster structure to which the belonging cluster structure 1s merged, and an adjacent cluster structure existing in a same hierarchy as re-verification determination data, and holding the result in a predetermined storage device, and wherein if any one of addition, update, or deletion of point data is performed, specifying a cluster structure in which a change occurs due to the point data using the re-verification determination data, and specifying a re-merging destination of a cluster structure from the adjacent cluster structure in the re-verification determination data.

5. The data analysis method according to claim 4 in which the data analysis device searches for neighborhood core point data which is another core which is different from the re-verification point data from the existing cluster structures having the re-verification point data as a center, and determines, based on the search, whether neighborhood core point data exists and whether the re-verification point data and the neighborhood core point data are in a predetermined neighborhood relationship, wherein the data analysis device:
- causes the existing cluster structures having the re-verification point data as a center to disappear if the neighborhood core point data does not exist as a result of the search,
- reduces the existing cluster structures including the neighborhood core point data if one of the neighborhood core point data exists and the re-verification point data and the neighborhood core point data are in a predetermined neighborhood relationship, and
- divides each of the corresponding cluster structures if a plurality of pieces of neighborhood core point data exist and the re-verification point data and each piece of the neighborhood core point data are not in the predetermined neighborhood relationship.

6. The data analysis method according to claim 4 in which the data analysis device further performs processing for causing a predetermined output device to display a data management screen, and any of predetermined processing of adding, updating, or deleting clustering target point data according to a user's instruction received in the data management screen, and displaying on the output device:
- a result of a change in an initial condition value of a cluster structure due to a recalculation according to the addition, update, or deletion of point data; and
- a result of a change in the cluster structure according to the change in the initial condition value of the cluster structure, and processing for returning the initial condition value of the cluster structure and the cluster structure indicated in the result of a change in the initial condition value and the result of a change in a cluster structure before any processing of the addition, update, or deletion of the point data if a user's instruction to confirm or cancel each of the displayed results is received.

* * * * *